(12) United States Patent
Cheng

(10) Patent No.: US 6,361,002 B1
(45) Date of Patent: Mar. 26, 2002

(54) TELESCOPING ROD

(76) Inventor: Kun-Chia Cheng, No. 76-30, Fu-Ma St., Changhwa City (TW)

( * ) Notice: Subject to any disclaimer, the term of this patent is extended or adjusted under 35 U.S.C. 154(b) by 0 days.

(21) Appl. No.: 09/721,381

(22) Filed: Nov. 22, 2000

(51) Int. Cl.⁷ ................................................ F16M 11/00
(52) U.S. Cl. ..................... 248/161; 403/109.5; 248/157
(58) Field of Search .................................. 248/161, 157, 248/333, 405, 411, 412; 403/109.1, 109.2, 109.5, 377, 379.6

(56) References Cited

U.S. PATENT DOCUMENTS

| | | | | |
|---|---|---|---|---|
| 3,724,885 A | * | 4/1973 | Becker | 287/58 CT |
| 4,076,437 A | * | 2/1978 | Mazzolla | 403/350 |
| 5,492,430 A | * | 2/1996 | Jones | 403/109 |

* cited by examiner

*Primary Examiner*—Anita King
*Assistant Examiner*—Ingrid Weinhold

(74) *Attorney, Agent, or Firm*—Thorp Reed & Armstrong, LLP

(57) ABSTRACT

A telescoping rod includes a first end piece and a positioning seat pivotally mounted on the first end piece. An external rod is securely attached to the positioning seat. A polygonal shaft has one end securely mounted in and engaged to the first end piece. The polygonal shaft extends through the first end piece, the positioning seat and the external rod. A second end piece is movably received in the external rod and has a bottom. The second end piece is penetrated and driven by said polygonal shaft. A block eccentrically extends from the bottom of the second end piece. An elliptical sleeve is mounted on the second end piece and has a through hole defined to receive the block. The through hole of the elliptical sleeve has a diameter greater than that of the block of the second end piece and forms a gap between the elliptical sleeve and the block of the second end piece. The elliptical sleeve is driven to press against an interior, periphery of the external rod by the block of the second end piece. A second positioning seat is pivotally mounted on the second end piece and attaches to an internal rod. The internal and the external rods are round or elliptical to advantageously alter the conventional telescoping rod that must be round.

10 Claims, 4 Drawing Sheets

TELESCOPING ROD

BACKGROUND OF THE INVENTION

1. Field of the Invention

The present invention relates to a rod, and more particularly to a telescoping rod that includes a hollow external rod and a hollow internal rod slidably received in the external rod. An offset cam is pivotally mounted in an internal end of the internal rod to position the internal rod on the inner sidewall of the external rod when the internal rod is extended to a suitable length.

2. Description of Related Art

A conventional telescoping rod in accordance with the prior art comprises an external rod and an internal rod with an actuated end moved in the external rod. One end of a positioning seat is securely attached to the actuated end of the internal rod. The diameter of the positioning seat is smaller than the internal diameter of the external rod. A longitudinal gap is eccentrically defined in the other end of the positioning seat. A C-shaped eccentric piece is mounted in the longitudinal gap. A stopper extends from the positioning seat in the longitudinal gap to prevent the eccentric piece from rotating when the internal rod is rotated. After the internal rod is extended to a suitable distance, the eccentric piece is rotated so it presses against the interior periphery of the external rod. The total length of the conventional telescoping rod can be adjusted, but the elements of the telescoping rod in accordance with the prior art can only be used in a round rod. The scope of use of the conventional telescoping rod is small.

The present invention has arisen to mitigate and/or obviate the disadvantages of the conventional telescoping rod.

SUMMARY OF THE INVENTION

In accordance with one aspect of the present invention, a telescoping rod includes a first end piece and a positioning seat rotatably mounted on the first end piece. An external rod is securely attached to the positioning seat. One end of a polygonal shaft is securely mounted in and engaged to the first end piece. The polygonal shaft extends through the first end piece, the positioning seat and the external rod. A second end piece is movably received in the external rod and has a bottom. The second end piece is penetrated and driven by said polygonal shaft. A sleeve eccentrically extends from the bottom of the second end piece. An elliptical sleeve is mounted on the second end piece and has a through hole defined to receive the block. The through hole of the elliptical sleeve has a diameter greater than that of the block of the second end piece and forms a gap between the elliptical sleeve and the block of the second end piece. The elliptical sleeve is driven to press against an interior periphery of the external rod by the block of the second end piece. A second positioning seat is pivotally mounted on the second end piece and is attached to an internal rod.

Further benefits and advantages of the present invention will become apparent after a carefull reading of the detailed description with appropriate reference to the accompanying drawings.

BRIEF DESCRIPTION OF THE DRAWINGS

FIG. 4 is an operational top plan view in partial section of the telescoping rod in FIG. 1.

DETAILED DESCRIPTION OF THE INVENTION

Figure 1:
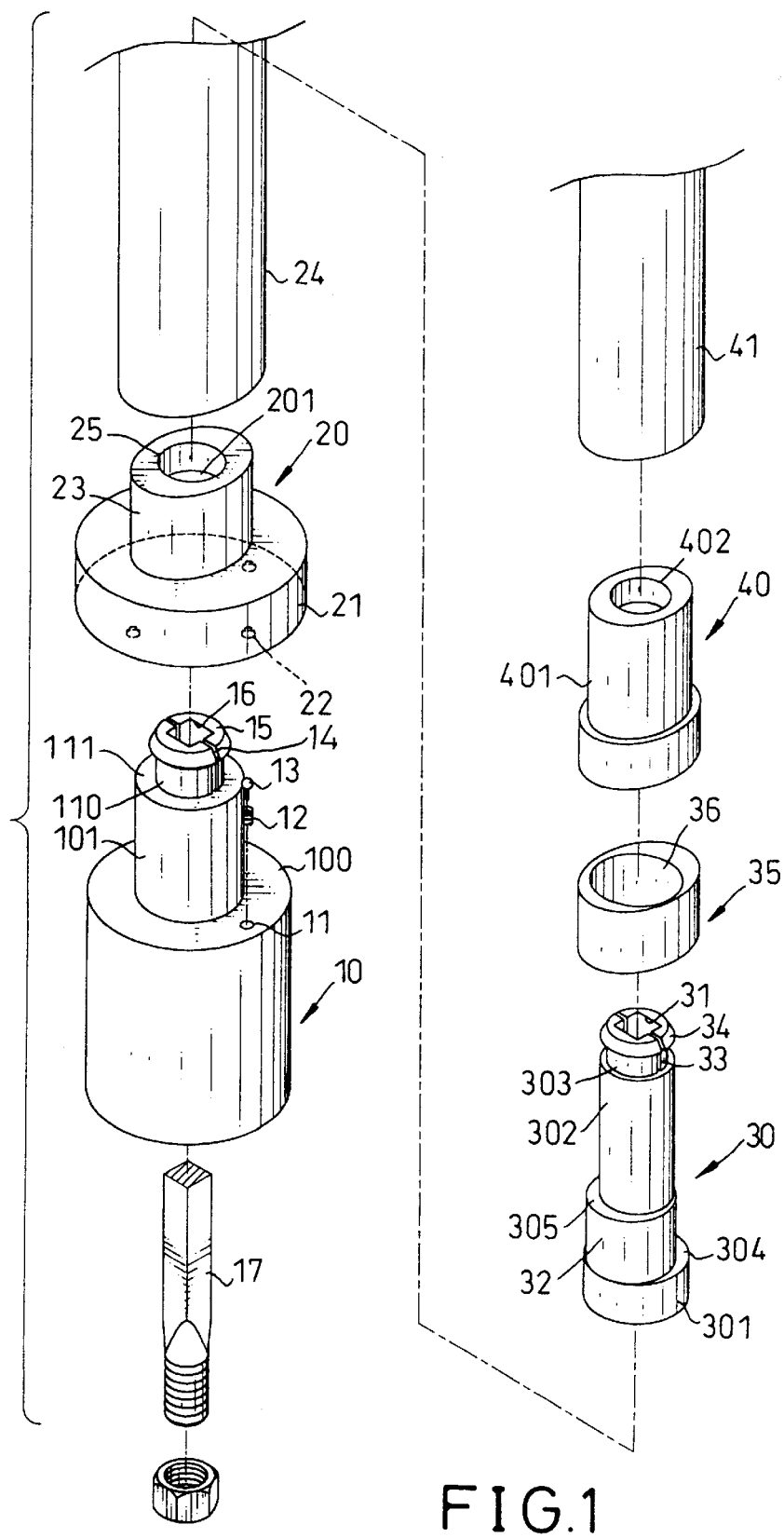
FIG. 1 is an exploded perspective view of a telescoping rod in accordance with the present invention.
Figure 2:
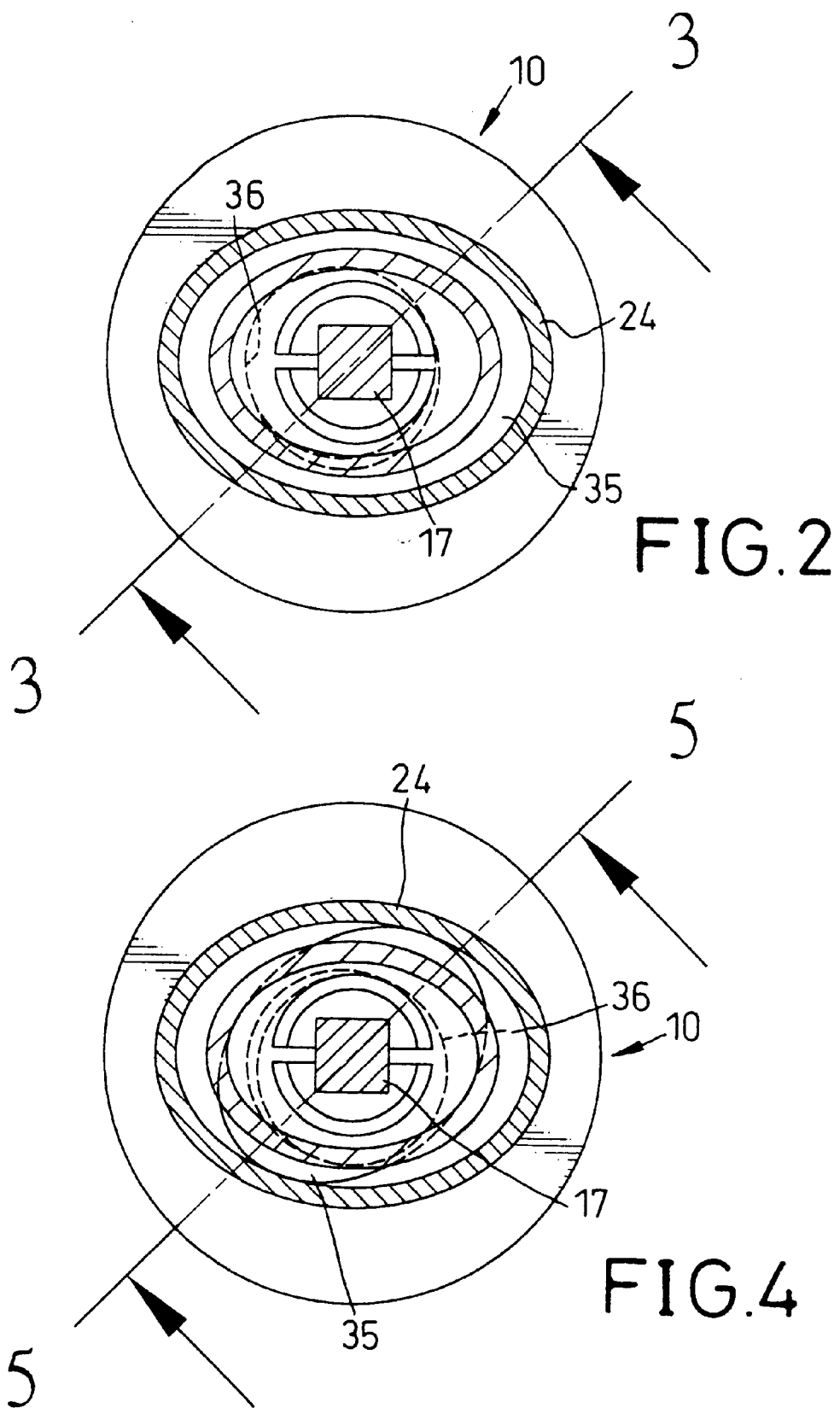
FIG. 2 is a top plan view in partial section of the telescoping rod in FIG. 1.
Figure 3:
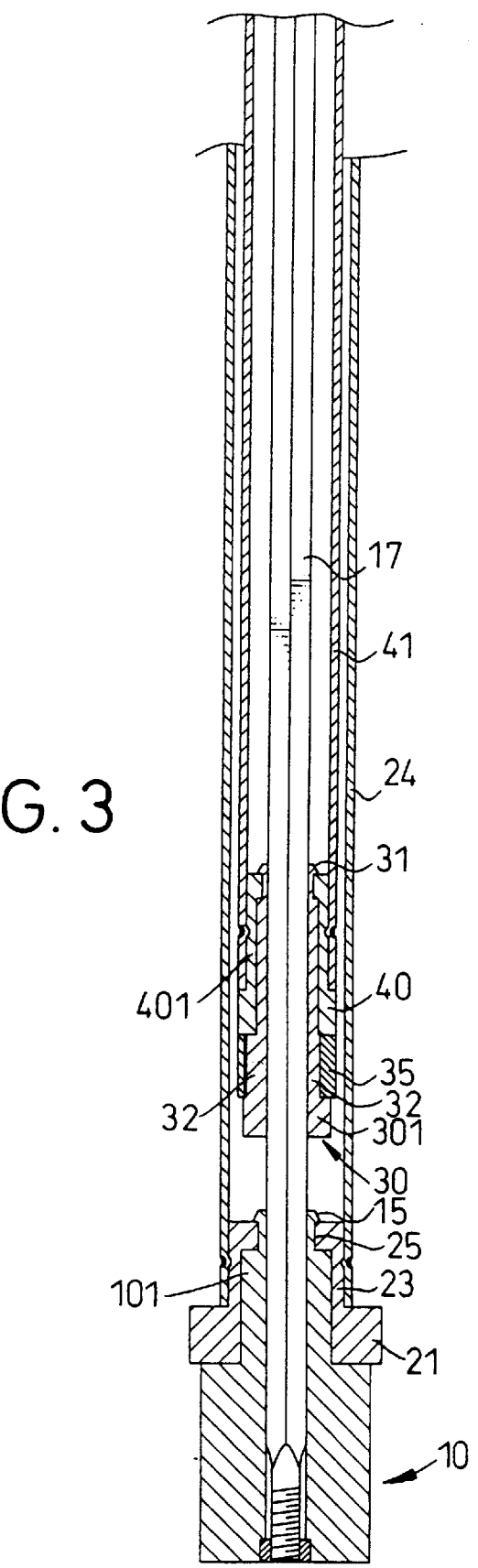
FIG. 3 is a cross-sectional side plan view of the telescoping rod along the line 3—3 in FIG.2.

With reference to the drawings and initially to FIGS. 1 to 3, a telescoping rod in accordance with the present invention comprises a hollow exterior rod (24), a hollow interior rod (41), a first end piece (10), a first positioning seat (20), a second end piece (30), a second positioning seat (40) and a polygonal shaft (17). The first end piece (10), the first positioning seat and the polygonal shaft (17) are securely mounted in one end of the external rod (24). The second end piece (30) and the second positioning seat (40) are securely mounted in the corresponding end of the internal rod (41). The first end piece (10) and the second end piece (30) are keyed on the polygonal shaft (17) so that they rotate together.

The first end piece (10) includes a cylindrical stub (101) axially extending from the top of the first end piece (10). The diameter of the stub (101) is smaller than that of the first end piece (10) such that a first shoulder (100) is formed on the first end piece (10) at the junction with the stub (101). A blind hole (11) is defined in the first shoulder (100) and receives a spring (12) and a steel ball (13) in the blind hole (11). The steel ball (13) partially extends out of the shoulder (100). A first split nipple (110) axially extends from the top of the stub (101) and has a first longitudinal gap (14) defined between the two halves of the first split nipple (110). The diameter of the first split nipple (110) is smaller than that of the stub (101) whereby a second shoulder (111) is formed on the top of the stub (101) at the junction with the split nipple (110). A first annular flange (15) extends radially out from the top of the first split nipple (110) and a first polygonal hole (16) corresponding to the shape of the polygonal shaft (17) is axially defined in the first split nipple (110). The first polygonal hole (16) extends through the first split nipple (110), the stub (101) and the first end piece (10).

The first positioning seat (20) is rotatably mounted on the stub (101) of the first end piece (10). The first positioning seat (20)includes a bottom plate (21) and an elliptical stub (23) axially extending out from the bottom plate (21). The elliptical stub (23) is securely mounted in one end of the external rod (24). A circular through hole (201) is axially defined in the first positioning seat (20) and extends through the elliptical stub (23) and the bottom plate (21). An annular flange (25) radially extends inward from the top of the elliptical stub (23). When the first positioning seat (20) is pressed onto the stub (101) of the first end piece (10), the split nipple (110) passes through the annular flange (25) in the first positioning seat (20), and the first annular flange (15) on the split nipple (110) clamps the top edge of the annular flange (25). Three sockets (22) are defined in one side of the bottom plate (21) facing the first shoulder (100) and each corresponds to the blind hole (11) in the first shoulder (100). When the first end piece (10) is rotated, the top portion of the steel ball (13) presses into one of the sockets (22) to provide a temporary restraint to the relative rotation of the first end piece (10) and the first positioning seat (20).

The polygonal shaft (17) extends through the first polygonal hole (16) in the first end piece (10) and the first positioning seat (20) and has one end secured in the first end piece (10).

The second end piece (30) is movably received in the external rod (24) and is slidably mounted on the polygonal shaft (17). The second end piece (30) includes a bottom plate (301) and an axially eccentric block (32) extending from the top of the bottom plate (301) of the second end piece (30). The diameter of the block (32) is smaller than that of the bottom plate (301) of the second end piece (30) such that a third shoulder (304) is formed on the top of the bottom plate (301) of the second end piece (30). An axial stub (302) extends from the block (32) and corresponds to the stub (101) on the first end piece (10). The diameter of the stub (302) on the second end piece (30) is smaller than that of the block (32) such that a fourth shoulder (305) is formed on the top of the block (32). A second split nipple (303) extends from the top of the stub (302) on the second end piece (30). The second split nipple (303) includes a second longitudinal gap (33), a second flange (34) and a second polygonal hole (31) respectively being the same as the first longitudinal gap (14), the first flange (15) and the first polygonal hole (16) of the first end piece (10). The second polygonal hole (31) extends through the second end piece (30) and aligns with the first polygonal hole (16) in the first end piece (10).

An elliptical sleeve (35) is mounted on the second end piece (30). The elliptical sleeve (35) includes a through hole (36) eccentrically defined in the elliptical sleeve (35). The diameter of the through hole (36) of the elliptical sleeve (35) is larger than that of the block (32) of the second end piece (30). The through hole (36) of the elliptical sleeve (35) receives the block (32) of the second end piece (30) so that the elliptical sleeve (35) is driven by the second end piece (30) to securely press against the interior periphery of the external rod (24).

A second positioning seat (40) is mounted on the stub (302) of the second end piece (30) and clamped in place by the second split nipple (303) after the second flange (34) extending through a through hole (402) axially defined in the second positioning seat (40). A hollow elliptical stub (401) extends out from the second positioning seat (40) to securely connect to the inside of the internal (41), movably received in the external rod (24).

Figure 5:
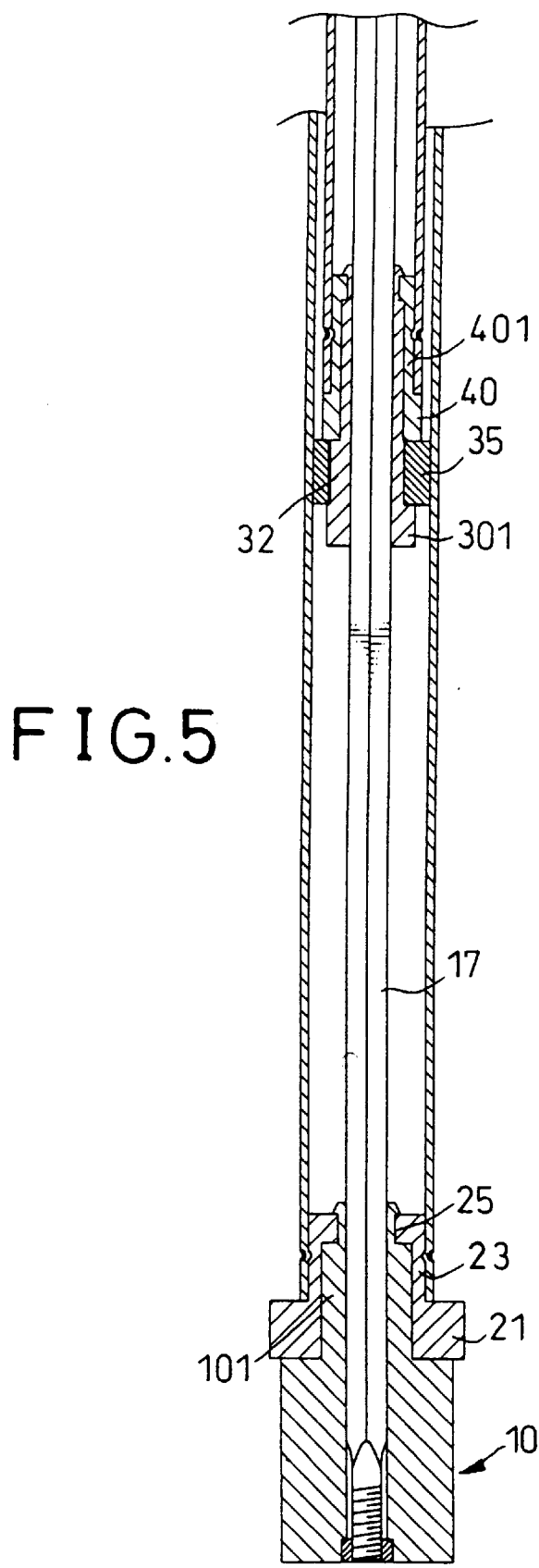
FIG. 5 is an operational cross-sectional side plan view of the telescoping rod along the line 5—5 in FIG. 4.

With reference to the FIG. 5, the internal rod (41) is pulled out from the external rod (24) to a suitable length, and drives the first end piece (10) to drive the second end piece (30) by the polygonal shaft (17). Further referring FIG. 4, then the elliptical sleeve (35) is driven to engage the interior wall of the external rod (24) to hold the internal rod in place because the elliptical sleeve (35) is securely mounted in the second end piece (30). The steel ball (13) simultaneously moves from one socket (22) to another.

As described above, the telescoping rod in accordance with the present invention includes several advantages.

1. The rods of the telescoping rod could be round or elliptical so that the scope of using of the present invention is wilder than that of the conventional telescoping rod.

2. The telescoping rod is easy to control. The first end piece is turned to a certain angle to drive the second end piece by the polygonal shaft. The angle of the preferred embodiment of the present invention is 90°. The elliptical sleeve is driven by the second end piece to securely press against the, interior periphery of the external rod. There is only one step to secure the internal rod on the external rod.

Although the invention has been explained in relation to its preferred embodiment, it is to be understood that many other possible modifications and variations can be made without departing from the spirit and scope of the invention as hereinafter claimed.

What is claimed is:

1. A telescoping rod comprising:

a first end piece;

a positioning seat pivotally mounted on said first end piece and having an external rod securely attached to said positioning seat;

a polygonal shaft having one end mounted in said first end piece and slidably engaged to said first end piece, said polygonal shaft extending through said first end piece, said positioning seat and said external rod;

a second end piece movably received in said external rod and having a bottom, said second end piece penetrated and driven by said polygonal shaft, and a block eccentrically extending from said bottom of said second end piece;

an elliptical sleeve mounted on said second end piece and having a through hole defined to receive said block, said through hole of said elliptical sleeve having a diameter greater than that of said block of said second end piece and forming a gap between said elliptical sleeve and said block of said second end piece, said elliptical sleeve driven to press against an interior periphery of said external rod by said block of said second end piece; and a second positioning seat rotatably mounted on said second end piece and having an internal rod attached to said second end piece.

2. The telescoping rod as claimed in claim 1, wherein said external rod and said internal rod are elliptical.

3. The telescoping rod as claimed in claim 1, wherein said first end piece comprises an axial stub received in said first positioning seat, said stub having a diameter smaller than that of said first end piece and forming a first shoulder on one side of said first end piece, a blind hole defined in said first shoulder, a spring received in said blind hole and a steel ball received in said blind hole to abut said spring, said steel ball partially extending out from said blind hole, said first positioning seat having a bottom plate with one end facing said first shoulder, multiple sockets defined in said end of said bottom plate of said first positioning seat to partially receive said steel ball.

4. The telescoping rod as claimed in claim 2, wherein said first end piece comprises a stub axially extending from said first end piece and received in said first positioning seat, said stub having a diameter smaller than that of said first end piece and forming a first shoulder on one side of said first end piece, a blind hole defined in said first shoulder, a spring received in said blind hole and a steel ball received in said blind hole to abut said spring, said steel ball partially extending out from said blind hole, said first positioning seat having a bottom plate with one end facing said first shoulder, multiple sockets defined in said end of said bottom plate of said first positioning seat to partially receive said steel ball.

5. The telescoping rod as claimed in claim 3, wherein said first end piece comprises a first polygonal hole axially and longitudinally defined to slidably receive said polygonal shaft, said first polygonal hole extending through said first end piece and having a shape corresponding to that of said polygonal shaft.

6. The telescoping rod as claimed in claim 3, wherein said second end piece comprises a stub axially extending along said bottom plate of said second end piece and received in said second positioning seat, a second split nipple formed on a free end of said stub of said second end piece to clamp said second positioning seat in place to prevent said elliptical sleeve from detaching from said second end piece.

7. The telescoping rod as claimed in claim 3, wherein said second end piece comprises a second polygonal hole axially and longitudinally defined to slidably receive said polygonal shaft, said polygonal hole extending through said second end piece and having a shape corresponding to that of said polygonal shaft.

8. The telescoping rod as claimed in claim 4, wherein said first end piece comprises a first polygonal hole axially and longitudinally defined to slidably receive said polygonal shaft, said first polygonal hole extending through said first end piece and having a shape corresponding to that of said polygonal shaft.

9. The telescoping rod as claimed in claim 4, wherein said second end piece comprises a stub axially extending along said bottom plate of said second end piece and received in said second positioning seat, a second split nipple formed on a free end of said stub of said second end piece to clamp said second positioning seat in place to prevent said elliptical sleeve from detaching from said second, end piece.

10. The telescoping rod as claimed in claim 4, wherein said second end piece comprises a second polygonal hole axially and longitudinally defined to slidably receive said polygonal shaft, said polygonal hole extending through said second end piece and having a shape corresponding to that of said polygonal shaft.

\* \* \* \* \*